United States Patent
Ke

(10) Patent No.: US 8,374,598 B2
(45) Date of Patent: Feb. 12, 2013

(54) METHOD FOR DRIFT RADIO NETWORK CONTROLLER TO REPORT THAT CELL DOES NOT SUPPORT TRANSMISSION INTERVAL

(75) Inventor: Yazhu Ke, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 372 days.

(21) Appl. No.: 12/449,997

(22) PCT Filed: Dec. 14, 2007

(86) PCT No.: PCT/CN2007/003597
§ 371 (c)(1),
(2), (4) Date: Sep. 3, 2009

(87) PCT Pub. No.: WO2008/116361
PCT Pub. Date: Oct. 2, 2008

(65) Prior Publication Data
US 2010/0093339 A1    Apr. 15, 2010

(30) Foreign Application Priority Data

Mar. 23, 2007   (CN) .......................... 2007 1 0091234

(51) Int. Cl.
*H04W 24/00* (2009.01)
(52) U.S. Cl. ..................... 455/424; 455/436; 455/67.11; 455/560; 370/328; 370/331
(58) Field of Classification Search .................. 455/423, 455/424, 436, 67.11, 560, 442; 370/328–332
See application file for complete search history.

(56) References Cited

U.S. PATENT DOCUMENTS

| | | | |
|---|---|---|---|
| 2004/0087340 A1* | 5/2004 | Cao et al. | 455/560 |
| 2006/0140148 A1 | 6/2006 | Kwak | |
| 2007/0206530 A1* | 9/2007 | Lee et al. | 370/329 |
| 2008/0207245 A1* | 8/2008 | Wakabayashi et al. | 455/522 |

FOREIGN PATENT DOCUMENTS

| | | |
|---|---|---|
| JP | 2002-247627 | 8/2002 |
| JP | 2005-323378 | 11/2005 |
| JP | 2006-087121 | 3/2006 |
| JP | 2007-053747 | 3/2007 |
| KR | 20050020058 | 3/2005 |
| WO | WO0189235 | 11/2001 |
| WO | WO 2006/016786 | 2/2006 |

* cited by examiner

*Primary Examiner* — Marcos Torres
(74) *Attorney, Agent, or Firm* — Farjami & Farjami LLP

(57) ABSTRACT

The present invention discloses a method for a drift radio network controller (DRNC) to report that the transmission interval is not supported, in which, the DRNC reports the information that the cell does not support enhanced-dedicated channel (E-DCH transmission interval to the service radio network controller (SRNC) through signaling when the DRNC detects that its administrative cell does not support E-DCH transmission interval. By reporting the information that the administrative cell of the DRNC does not support E-DCH 2 ms transmission interval to the SRNC by the DRNC, the present invention enables the SRNC to obtain the information and accordingly to take part in making decision of stopping a user equipment from using the E-DCH 2 ms transmission interval or deleting the cell link that does not support the E-DCH 2 ms transmission interval, thus ensures normal communication of the user equipment.

16 Claims, 1 Drawing Sheet

```
┌─────────────────┐                    ┌─────────────────┐
│ Service radio   │                    │  Drift radio    │
│network controller│                   │network controller│
└────────┬────────┘                    └────────┬────────┘
         │                                      │
         │  101, Error indication: including such│
         │  information that E-DCH transmission │
         │       interval is not supported      │
         │◄─────────────────────────────────────│
         │                                      │
```

METHOD FOR DRIFT RADIO NETWORK CONTROLLER TO REPORT THAT CELL DOES NOT SUPPORT TRANSMISSION INTERVAL

This is a U.S. national phase application which is based on, and claims priority from, PCT application Serial No. PCT/CN2007/003597, filed Dec. 14, 2007, which claims priority from foreign application Serial No. 200710091234.1, filed Mar. 23, 2007 in China.

TECHNICAL FIELD

The present invention relates to a radio communication system, and especially, to a method for a drift radio network controller to report that a cell does not support the transmission interval.

BACKGROUND OF THE RELATED ART

In a mobile communication network, the core network connects with a radio network controller in a radio access network, and the radio network controller controls several node Bs. The radio access network includes one or more radio network subsystems, each of which is a subnet within the access network and has a radio network controller and one or more node Bs. The radio network controller is a network element responsible for controlling radio resource in the access network, and the main function of node B is to process the air interface physical layer as well as some basic operations of radio resource management. When a user equipment establishes communication relationship with several radio network controllers, these radio network controllers connect with each other though Iur interface, and then, the radio network controller which connects the user equipment with the core network is referred to as a service radio network controller, and the radio network controller which offers signaling and data transmission for the user equipment but does not connect the user equipment with the core network is referred to as a drift radio network controller; and the drift radio network controller is also responsible for transferring the support capability of its administrative cell of node B to the service radio network controller.

In the existing system technology optimization, in order to improve the quality of user's experience and the system throughput, uplink introduces the technology of high speed packet access which uses the Enhanced-Dedicated Channel (E-DCH) that can apply with two transmission intervals: 2 ms and 10 ms respectively. Node B can only supports 10 ms transmission interval. Therefore, for the user equipment supporting the E-DCH 2 ms transmission interval, the function of 2 ms transmission interval can only be normally used with cooperation of node B supporting E-DCH 2 ms transmission interval to obtain higher packet speed. A radio network controller should at first judge whether node B supports E-DCH 2 ms transmission interval or not to make a right decision when it determines whether to use the E-DCH 2 ms transmission interval or not.

SUMMARY OF THE INVENTION

The technical problem to be solved by the present invention is to provide a method for a drift radio network controller to report that a cell does not support the transmission interval to make a service radio network controller obtain the information to taking part in making decision of stopping a user equipment from using E-DCH transmission interval or deleting the cell link which does not support E-DCH transmission interval, thus ensuring the normal communication of the user equipment.

In order to solve the above technical problem, the present invention provides a method for a drift radio network controller to report that the transmission interval is unable to be supported, in which the drift radio network controller reports by signaling the information that the cell does not support E-DCH transmission interval to the service radio network controller when it detects that its administrative cell does not support E-DCH transmission interval.

Said method of the present invention, wherein, said signaling is any one or a combination of the following messages: message of error indication, message of radio link establishment failure, message of radio link addition failure and message of radio link reconfiguration failure.

Said method of the present invention, wherein, said drift radio network controller sends a message of error indication including the information that said cell does not support E-DCH transmission interval to the service radio network controller when it detects that the cell does not support E-DCH transmission interval.

Said method of the present invention, wherein, said service radio network controller sends a request for establishing radio link to the drift radio network controller, and if said drift radio network controller determines that the service radio network controller has configured E-DCH transmission interval for the need-to-be-established radio link after receiving the information and the cell does not support E-DCH transmission interval, said drift radio network controller sends a message of radio link establishment failure including the information that said cell does not support E-DCH transmission interval to the service radio network controller.

Said method of the present invention, wherein, said service radio network controller sends a request for adding radio link to the drift radio network controller, and if the drift radio network controller determines that the service radio network controller has configured E-DCH transmission interval for the need-to-be-added radio link after receiving said information and its corresponding cell does not support E-DCH transmission interval, said drift radio network controller sends a message of radio link addition failure including the information that the cell does not support E-DCH transmission interval to the service radio network controller.

Said method of the present invention, wherein, said service radio network controller sends request for reconfiguring radio link or preparing for radio link reconfiguration to the drift radio network controller, and if the drift radio network controller determines that the service radio network controller configures E-DCH transmission interval for the need-to-be-reconfigured radio link after receiving the information and its corresponding cell does not support the E-DCH transmission interval, said drift radio network controller sends a message of radio link reconfiguration failure including the information that the cell does not support the E-DCH transmission interval to the service radio network controller.

Said method of the present invention, wherein, said method for reporting the information that the cell does not support the E-DCH transmission interval is to add the information that the cell does not support E-DCH transmission interval in the "reason" value of the present cell of said signaling.

Furthermore, the transmission interval of the E-DCH that said cell does not support is 2 ms transmission interval.

Said method of the present invention, wherein, there are one or more cells which do not support the E-DCH transmission interval, and said signaling carries the information that one or more cells do not support the E-DCH transmission interval.

Said method of the present invention, wherein, said cell indicates the cell in which there is signaling and data transmission between the user equipment and said service radio network controller, and radio link is to be established or has been established for the user equipment in the administrative cell of the drift radio network controller.

By reporting in the information that administrative cell of the drift radio network controller does not support E-DCH 2 ms transmission interval to the service radio network controller, said method of the present invention makes the service radio network controller obtain the information to taking part in making decision of stopping the user equipment from using E-DCH 2 ms transmission interval or deleting the cell link which does not support the E-DCH 2 ms transmission interval, thus ensures the normal communication of the user equipment.

THE PREFERRED EMBODIMENTS OF THE PRESENT INVENTION

Figure 1:
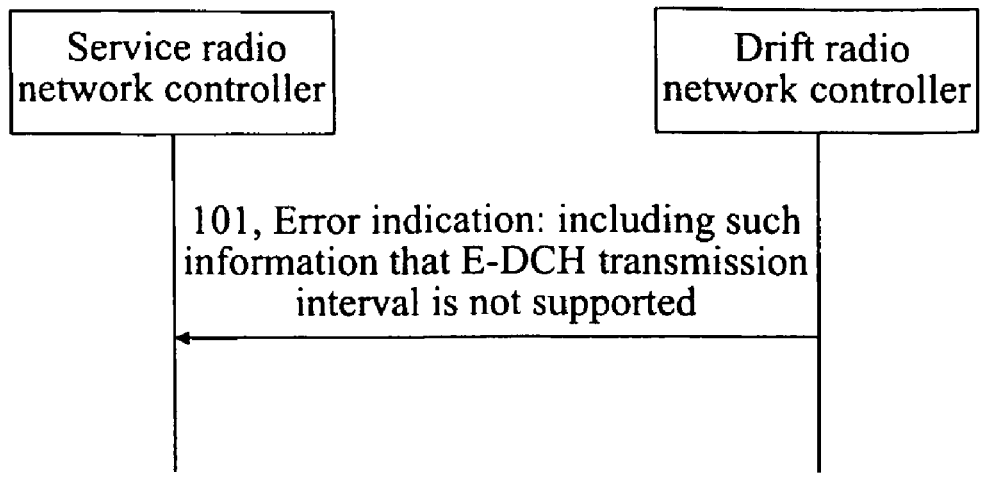
FIG. 1 illustrates the steps of reporting in accordance with embodiment 1 of the present invention.

The implementation of the technical scheme of the present invention will be described in further detail with combination of the accompanying figures:

As shown in FIG. 1, embodiment 1 offers a method for the drift radio network controller to report the information that its administrative cell does not support E-DCH 2 ms transmission interval through the message of error indication.

Step 101, when the drift radio network controller determines that its corresponding cell does not support E-DCH 2 ms transmission interval, sending by the drift radio network controller a message of error indication including the information that the cell does not support E-DCH transmission interval to the service radio network controller. Wherein, said cell refers to the cell between which and the user equipment and said service radio network controller signaling and data transmission is needed, and the cell in which radio link is to be established or has been established for the user equipment in the administrative cell of the drift radio network controller, and there are one or more such cells. Said signaling may carry the information that one or more cells do not support E-DCH transmission interval.

Figure 2:
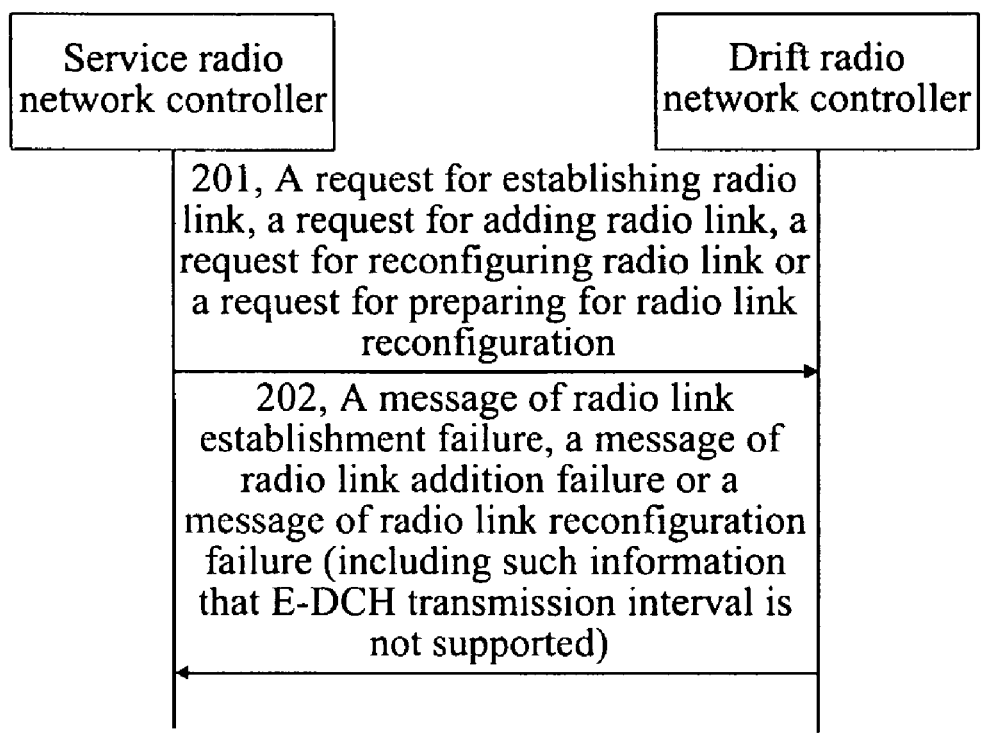
FIG. 2 illustrates the steps of reporting in accordance with embodiment 2 of the present invention.

As shown in FIG. 2, embodiment 2 offers a method for the drift radio network controller to report the information that its administrative cell does not support E-DCH 2 ms transmission interval through the message of radio link establishment failure, the message of radio link addition failure or the message of radio link reconfiguration failure.

Step 201, sending by the service radio network controller a request for establishing radio link, a request for adding radio link, a request for reconfiguring radio link or a request for preparing radio link reconfiguration to the drift radio network controller;

Step 202, if the drift radio network controller determines that the service radio network controller has configured E-DCH 2 ms transmission interval for the need-to-be-established, need-to-be-added or need-to-be-reconfigured radio link after receiving the information, and the corresponding cell does not support E-DCH 2 ms transmission interval, sending by the drift radio network controller a message of radio link establishment failure, a message of radio link addition failure or a message of radio link reconfiguration failure to the service radio network controller, and the message carries the information that the cell does not support the E-DCH transmission interval.

In the above embodiments, said method for reporting the information that a cell does not support E-DCH transmission interval is to add the information that the cell does not support the E-DCH transmission interval in "reason" values of the present signaling element of said signaling, furthermore, to add information that the E-DCH 2 ms transmission interval is unable to be supported in "reason" values of the present signaling element of said signaling. Said signaling in the above embodiments is any one or a combination of the following messages: message of error indication, triggered by the drift radio network controller; message of radio link establishment failure, triggered by the service radio network controller issuing a request for establishing radio link; message of radio link addition failure, triggered by the service radio network controller issuing a request for adding radio link; and message of radio link reconfiguration failure, triggered by the service radio network controller issuing a request for preparing radio link reconfiguration or request for reconfiguring radio link.

Of course, the present invention may have many other embodiments. Therefore, without departing from the spirit and essence of the present invention, those skilled in the field can make all kinds of modification or variations which all should belong to the scope of the claims of the present invention.

INDUSTRIAL APPLICABILITY

By reporting the information that the administrative cell of the drift radio network controller does not support E-DCH 2 ms transmission interval to the service radio network controller, said method of the present invention makes the service radio network controller obtain the information to taking part in making decision of stopping the user equipment from using E-DCH 2 ms transmission interval or deleting the cell link which does not support E-DCH 2 ms transmission interval, thus ensures the normal communication of the user equipment.

I claim:

1. A method for a drift radio network controller to report capability information, comprising reporting, by the drift radio network controller when detecting by the drift radio network controller that its administrative cell does not support an enhanced-dedicated channel transmission interval of 2 ms, to a service radio network controller such information that the cell does not support the enhanced-dedicated channel transmission interval of 2 ms through signaling, to make the service radio network controller obtain the information and take part in making decision of stopping a user equipment from using the enhanced-dedicated channel transmission interval of 2 ms or deleting a cell link which does not support the enhanced-dedicated channel transmission interval of 2 ms.

2. The method of claim 1, wherein said signaling is any one or a combination of the following messages: message of error indication, Message of radio link establishment failure, message of radio link addition failure and message of radio link reconfiguration failure.

3. The method of claim 2, wherein when the drift radio network controller detects that the does not support the enhanced-dedicated channel transmission interval of 2 ms, said drift radio network controller sends to said service radio network controller a message of error indication including such information that said cell does not support the enhanced-dedicated channel transmission interval of 2 ms.

4. The method of claim 2, wherein
said service radio network controller sends to the drift radio network controller a request for establishing a radio link, and
after receiving the message, if said drift radio network controller determines that said service radio network controller has configured the enhanced-dedicated channel transmission interval of 2 ms for the radio link to be established and the cell does not support the enhanced-dedicated channel transmission interval of 2 ms, said drift radio network controller sends to the service radio network controller a message of radio link establishment failure including such information that said cell does not support the enhanced-dedicated channel transmission interval of 2 ms.

5. The method of claim 2, wherein
said service radio network controller sends to said drift radio network controller a request for adding radio link, and
after receiving the message, if said drift radio network controller determines that said service radio network controller has configured the enhanced-dedicated channel transmission interval for the radio link to be added and the cell does not support enhanced-dedicated channel transmission interval of 2 ms, said drift radio network controller sends to the service radio network controller a message of radio link addition failure including such information that said cell does not support enhanced-dedicated channel transmission interval of 2 ms.

6. The method of claim 2, wherein
said service radio network controller sends to the drift radio network controller a request for preparing for a radio link reconfiguration or a request for reconfiguring a radio link, and
after receiving the message, if the drift radio network controller determines that the service radio network controller has configured the enhanced-dedicated channel transmission interval of 2 ms for the radio link to be prepared for reconfiguration or to be reconfigured and its corresponding cell does not support the enhanced-dedicated channel transmission interval of 2 ms, said drift radio network controller sends to the service radio network controller a message of radio link reconfiguration failure including such information that said cell does not support the enhanced-dedicated channel transmission interval of 2 ms.

7. The method of claim 1, wherein
the reporting such information that the cell does not support the enhanced-dedicated channel transmission interval of 2 ms is performed by adding, in "reason" values of the present signaling element of said signaling, such information that the cell does not support the enhanced-dedicated channel transmission interval of 2 ms.

8. The method of claim 1, wherein there is one or more said cells which do not support the enhanced-dedicated channel transmission interval of 2 ms, and said signaling carries such information that one or more cells do not support the enhanced-dedicated channel transmission interval of 2 ms.

9. The method of claim 1, wherein said cell is a cell that needs signaling and data transmission with the user equipment and said service radio network controller, and a cell in which a radio link is to be established or has been established for the user equipment in the administrative cell of said drift radio network controller.

10. The method of claim 2, wherein said cell is a cell that needs signaling and data transmission with the user equipment and said service radio network controller, and a cell in which a radio link is to be established or has been established for the user equipment in the administrative cell of said drift radio network controller.

11. The method of claim 3, wherein said cell is a cell that needs signaling and data transmission with the user equipment and said service radio network controller, and a cell in which a radio link is to be established or has been established for the user equipment in the administrative cell of said drift radio network controller.

12. The method of claim 4, wherein said cell is a cell that needs signaling and data transmission with the user equipment and said service radio network controller, and a cell in which a radio link is to be established or has been established for the user equipment in the administrative cell of said drift radio network controller.

13. The method of claim 5, wherein said cell is a cell that needs signaling and data transmission with the user equipment and said service radio network controller, and a cell in which a radio link is to be established or has been established for the user equipment in the administrative cell of said drift radio network controller.

14. The method of claim 6, wherein said cell is a cell that needs signaling and data transmission with the user equipment and said service radio network controller, and a cell in which a radio link is to be established or has been established for the user equipment in the administrative cell of said drift radio network controller.

15. The method of claim 7, wherein said cell is a cell that needs signaling and data transmission with the user equipment and said service radio network controller, and a cell in which a radio link is to be established or has been established for the user equipment in the administrative cell of said drift radio network controller.

16. The method of claim 8, wherein said cell is a cell that needs signaling and data transmission with the user equipment and said service radio network controller, and a cell in which a radio link is to be established or has been established for the user equipment in the administrative cell of said drift radio network controller.

* * * * *